April 3, 1945.  R. A. NORTON  2,373,080
GROUND WORKING DEVICE
Original Filed July 20, 1939   2 Sheets—Sheet 1
FIG. 1.
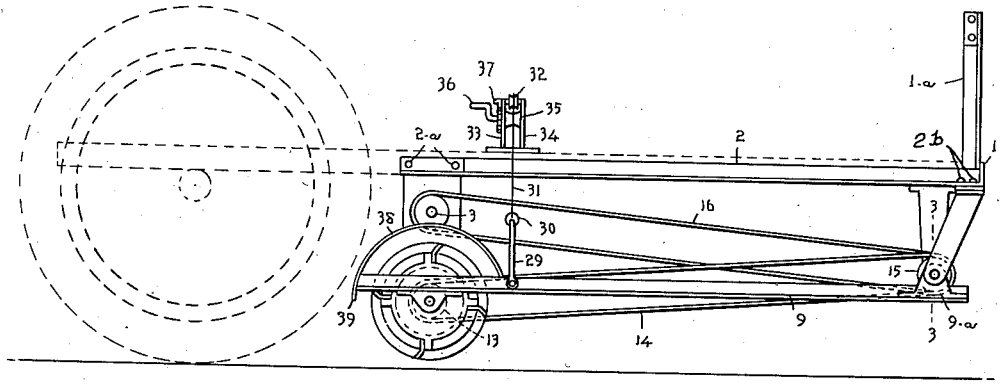
FIG. 2.   FIG. 3.
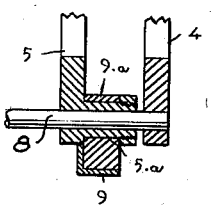
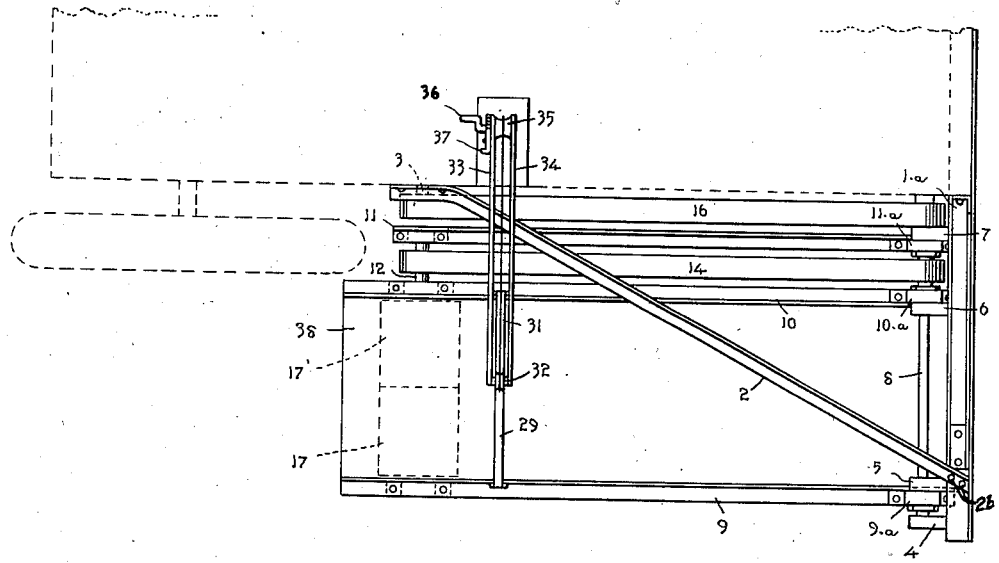
Rolland A. Norton, Inventor
By Ogle R. Singleton, Attorney April 3, 1945. R. A. NORTON 2,373,080
GROUND WORKING DEVICE
Original Filed July 20, 1939 2 Sheets-Sheet 2
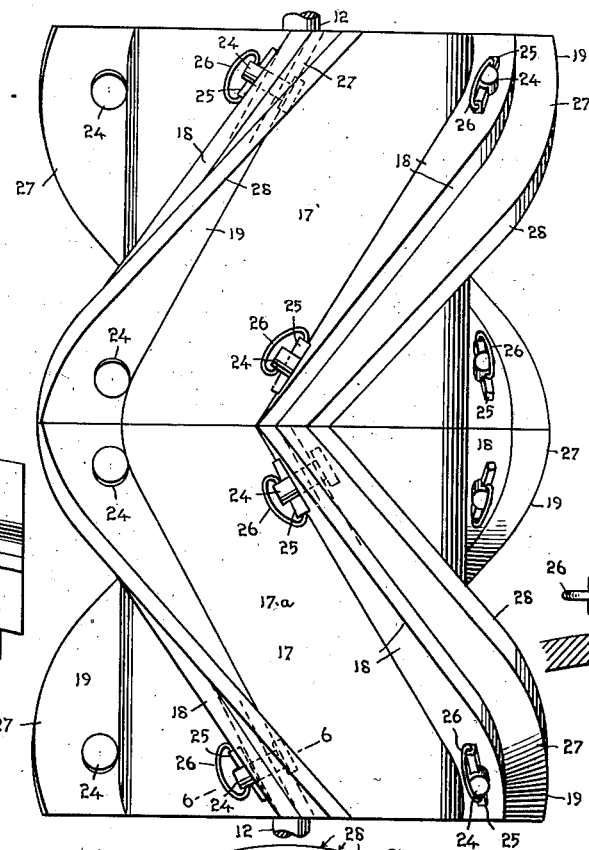
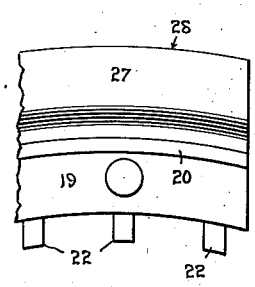
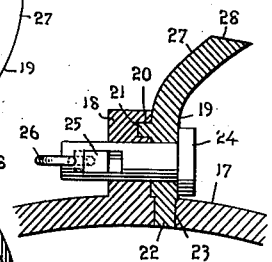
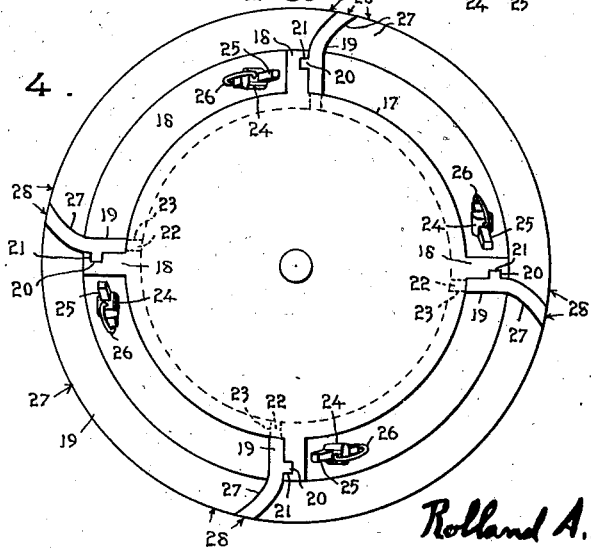
Inventor
Rolland A. Norton
By Ogle R. Singleton
Attorney Patented Apr. 3, 1945

2,373,080

UNITED STATES PATENT OFFICE 2,373,080

GROUND WORKING DEVICE

Rolland A. Norton, Norfolk, Va.

Original application July 20, 1939, Serial No. 285,603. Divided and this application October 24, 1941, Serial No. 416,398

2 Claims. (Cl. 97—219)

My invention consists in a new and useful improvement in ground working devices, and this application is a divisional application from my application Serial Number 285,603, filed on July 20, 1939, since matured into U. S. Patent No. 2,319,255. The particularly novel and useful feature of my invention described and claimed in this application is the rotary cutter member which comprises a pair of drums, each provided with a novel arrangement of series of cutter bars.

While I have illustrated in the drawings filed herewith and have hereinafter fully described certain embodiments of my invention, it is to be distinctly understood that I do not consider my invention limited to said specific embodiments, but refer for its scope to the claims appended hereto.

In the drawings:

Fig. 1 is a side elevation of my device.

Fig. 2 is a top plan view of the device.

Fig. 3 is a vertical section on the line 3—3 of Fig. 1.

Fig. 4 is an enlarged end view of the cutting drum.

Fig. 5 is an enlarged plan view of the cutting drums.

Fig. 6 is a vertical section on the line 6—6 of Fig. 5.

Fig. 7 is a fragmentary side elevation of one of the cutter bars.

As illustrated in the drawings, my device has a frame of beams and braces consisting of angle irons, of which the forward beam 1 is attached by suitable fastening means such as bolts (not shown) to the forward end of a tractor indicated in dotted lines, so as to extend laterally therefrom, and has the brace 1—a with its inner end attached to the tractor and its outer end to the outer end of the beam 1. The diagonally-disposed brace 2 is suitably attached by bolts 2—a to the side of the tractor adjacent the tractor pulley 3 (as illustrated in Figs. 1 and 2) and by bolts 2—b to the outer end of beam 1. From the outer end of the beam 1 there depends the bracket 4, and at suitable points along the beam 1 there are provided the depending brackets 5, 6 and 7 having hollow trunnions, such as 5—a (Fig. 3). Journaled in the bracket 4 and the hollow trunnions of the brackets 5, 6 and 7 is the shaft 8. I provide the pivotally mounted arms 9, 10 and 11, having collars 9—a, 10—a and 11—a respectively, carried by the trunnions of brackets 5, 6 and 7 respectively. Journaled in the outer ends of the arms 9, 10 and 11 is the shaft 12 having a pulley 13 connected by belt 14 with pulley 15 on shaft 8. The shaft 8 has a suitable pulley connected by belt 16 with the tractor power pulley 3.

Suitably mounted on the shaft 12 is the cutter member which consists of two cylindrical drums 17 and 17'. Formed integral with each of the drums 17 and 17' are four peripheral spiral flanges 18 so extended between the outer and inner edges of the circumferential face 17—a of each of the drums 17 and 17', that each of the flanges 18 embraces a quadrant of said face 17—a. Each flange 18 has mounted thereon a spiral cutter bar 19 having the key 20 received in the keyway 21 in the flange 18, and a series of lugs 22 received in orifices 23 in the face 17—a. Each bar 19 is locked to its flange 18 by a pair of bolts 24 transfixing bar 19 and flange 18. Each bolt 24 is so slotted as to receive therethrough the locking wedge 25 bearing against the flange 18, and urged to wedging action by the spring detent 26 bearing on the bolt 24 and head of wedge 25. The bars 19 are formed with arcuate cutting heads 27 everted from the flanges 18, with outer surfaces 28 concentric with the circumferential face 17—a. It is to be particularly noted that the drums 17 and 17' are disposed on the shaft 12 in the relation indicated in Fig. 5, that is to say the drums 17 and 17' are so related that the inner ends of the series of flanges 18 and their cutter bars 19 on each drum register precisely with those on the other drum, the spiral curvature of the flanges 18 and cutter bars 19 of each drum being reverse to those of the other drum, thereby producing a cutting member having four V-shaped cutter blades symmetrically disposed about the periphery of the member.

The pivotally mounted arms 9 and 10 are supported by a bail 29 passed through a ring 30 on cable 31 rove over pulley 32 journaled between arms 33 and 34 forming a winch mounted on the tractor and having drum 35 for cable 31, with crank 36 and detent 37.

Suitably mounted on arms 9 and 10 is the arcuate breaker plate 38 disposed over the drums 17 and 17' and having its rear end 39 extending somewhat below arms 9 and 10.

Having described the details of construction of my device, I will now describe its operation. The parts being disposed, as illustrated in Figs. 1 and 2, the device is transported by the tractor to the point where its operation is to occur. The operator then adjusts the pivotally mounted frame carrying the drums 17 and 17', to produce the desired depth of cut, by manipulation of the winch. He then applies power from the drive shaft of the tractor, through the driving means of the device to cause the drums 17 and 17' to revolve. It is to be noted that the direction of rotation of the drums 17 and 17' is such that the cutter bars 19 are caused to travel through the ground being worked in a direction opposite to the direction of travel of the tractor propelling my device, and that the arcuate cutter heads 27 of the cutter bars 19 are projected in the direction of rotation of the drums 17 and 17', and it is to be particularly noted that by reason of the configuration and disposition of the faces 28 of the arcuate heads 27 of the cutter bars 19, the abrasive action upon them incident to contact with the ground produces self-honing action on the cutter bars 19, also it is to be noted that the rear end 39 of the breaker plate 38 acts as a leveling means upon the worked ground. It is obvious that the plate 38 can be adjustably mounted so that the position of this end 39 may be disposed in the desired relation to the cutter member.

Having described my invention, what I claim is:

1. In a ground working device, the combination of a cylindrical drum; a series of spiral flanges formed integral with said drum on its circumferential face, each of said flanges having a longitudinal keyway; a spiral cutter bar associated with each of said flanges and having a longitudinal key received in the key-way of its associated flange, and a series of depending lugs received in orifices in the face of the drum; bolts transfixing each flange and its associated bar; a supporting medium for said drum; and means adapted to rotate said drum in said medium.

2. In a ground working device, the combination of a cylindrical drum; a series of spiral flanges formed integral with said drum on its circumferential face, each of said flanges having a keyway; a spiral cutter bar associated with each of said flanges, and having a key received in the key-way of its associated flange, and a series of depending lugs received in orifices in the face of the drum; slotted bolts transfixing each flange and its associated bar; a wedge received in the slot of each bolt and bearing against each bolt and its associated flange; a spring detent bearing against each bolt and its wedge; a supporting medium for said drum; and means adapted to rotate said drum in said medium.

ROLLAND A. NORTON.